United States Patent
Ushimaru et al.

(10) Patent No.: US 8,089,994 B2
(45) Date of Patent: Jan. 3, 2012

(54) PROCESSING APPARATUS AND METHOD OF PROCESSING AND METHOD OF MAKING LEAF SPRING

(75) Inventors: Akihiko Ushimaru, Kawasaki (JP); Michinao Nomura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 674 days.

(21) Appl. No.: 12/192,390

(22) Filed: Aug. 15, 2008

(65) Prior Publication Data

US 2009/0103579 A1    Apr. 23, 2009

(30) Foreign Application Priority Data

Oct. 23, 2007 (JP) ................................ 2007-275784

(51) Int. Cl.
  *H01S 3/121* (2006.01)
  *H01S 3/13* (2006.01)
(52) U.S. Cl. ..................... 372/29.014; 372/14
(58) Field of Classification Search ............ 372/29.014, 372/29.015, 29.021, 38.07, 14, 38.02
  See application file for complete search history.

(56) References Cited

U.S. PATENT DOCUMENTS

| 6,640,604 | B2 | 11/2003 | Matsushita |
| 2002/0108427 | A1* | 8/2002 | Matsushita .................. 72/342.1 |
| 2004/0037011 | A1 | 2/2004 | Inoue et al. |
| 2006/0114772 | A1 | 6/2006 | Egawa et al. |
| 2009/0039559 | A1 | 2/2009 | Kuno et al. |
| 2009/0127241 | A1 | 5/2009 | Inoue et al. |
| 2009/0128960 | A1 | 5/2009 | Inoue et al. |

FOREIGN PATENT DOCUMENTS

| JP | 62-110883 | A | | 5/1987 |
| JP | 05-138374 | A | | 6/1993 |
| JP | 8-132788 | A | | 5/1996 |
| JP | 09-150282 | A | | 6/1997 |
| JP | 10-128565 | A | | 5/1998 |
| JP | 2002-239757 | A | | 8/2002 |
| JP | 2004-82161 | A | | 3/2004 |
| JP | 2004-195467 | | * | 7/2004 |
| JP | 2004-195467 | A | | 7/2004 |
| JP | 2006-114627 | A | | 4/2006 |
| JP | 2006-150433 | | * | 6/2006 |
| JP | 2006-150433 | A | | 6/2006 |

OTHER PUBLICATIONS

Japanese Office Action dated Sep. 1, 2009, issued in corresponding Japanese Patent Application No. 2007-275784.
Korean Office Action dated Sep. 29, 2010, issued in corresponding Korean Patent Application No. 10-2008-0087311.

* cited by examiner

*Primary Examiner* — Armando Rodriguez
(74) *Attorney, Agent, or Firm* — Westerman, Hattori, Daniels & Adrian, LLP

(57) ABSTRACT

A light source emits a laser beam to the object through an output end. An optical system is placed between the output end and the object. The optical system adjusts the energy of the laser beam emitted, through the output end, onto a unit area for a unit time. The energy of the beam spot on the object enables cutting or bending of the object. The optical system serves to adjust the energy of the laser beam irradiated to the object. The energy of the laser beam instantly changes as compared with the case where the energy of the laser beam is adjusted based on a driving voltage applied to a laser oscillator. The object is thus processed by using the laser beam with high accuracy.

3 Claims, 8 Drawing Sheets

PROCESSING APPARATUS AND METHOD OF PROCESSING AND METHOD OF MAKING LEAF SPRING

BACKGROUND OF THE INVENTION

1. Field of the Invention

The present invention relates to a processing apparatus and a method of processing, the apparatus and the method utilizing the energy of a laser beam.

2. Description of the Prior Art

A laser beam is often utilized to cut an object as disclosed in Japanese Patent Application Publication No. 9-150282, for example. The laser beam forms a beam spot on the object. The laser beam penetrates through the object at the beam spot. The movement of the beam spot enables separation of a piece from the object.

In the case where the object is cut along a curved cutting line, for example, the movement of the beam spot should suffer from a reduced velocity for establishment of a required dimensional accuracy as compared with the case where the object is cut along a straight cutting line. In this case, if the energy of the laser beam is maintained at a constant level irrespective of a reduced velocity of the movement of the beam spot, the object is expected to enjoy a resultant surface resulting from the cutting utilizing the laser beam. The control on the output power of the laser beam, the pulse duty and the pulse frequency enable adjustment of the energy of the laser beam.

The control on the driving voltage of the laser oscillator is utilized to control the output power of the laser beam, the pulse duty and the pulse frequency. It is impossible to stabilize the driving voltage immediately after the driving voltage changes. The beam spot should thus suffer from variation in the energy.

SUMMARY OF THE INVENTION

It is accordingly an object of the present invention to provide a processing apparatus and a method of processing, the apparatus and the method contributing to avoidance of variation in the energy at a beam spot. It is also an object of the present invention to provide a method of making a leaf spring based on the mentioned method.

According to an aspect of the invention, there is provided a processing apparatus comprising: a stage supporting an object; a light source emitting a laser beam to the object through an output end; and an optical system placed between the output end and the object, the optical system adjusting the energy of the laser beam emitted, through the output end, onto a unit area for a unit time.

The processing apparatus allows the laser beam to form a beam spot on the object. The energy of the beam spot enables cutting or bending of the object. Moreover, the optical system serves to adjust the energy of the laser beam irradiated to the object. The energy of the laser beam instantly changes as compared with the case where the energy of the laser beam is adjusted based on a driving voltage applied to a laser oscillator, for example. The object is thus processed by using the laser beam with high accuracy.

The processing apparatus may further comprise: a driving mechanism causing a relative movement between the stage and the output end; and a controller circuit controlling adjustment of energy of the laser beam based on the acceleration of the relative movement. The relative movement between the stage and the output end induces the movement of the beam spot on the object. The energy of the laser beam at the beam spot is adjusted in response to the movement of the beam spot. Even when the beam spot moves on the object at a predetermined acceleration, the optical system serves to keep the energy of the laser beam constant at each specific position on the object. The object is thus processed with high accuracy regardless of the acceleration of the movement of the beam spot. Here, the term "acceleration" includes a negative acceleration, namely a deceleration. Accordingly, even when the beam spot moves on the object at a predetermined deceleration, the optical system serves to keep the energy of the laser beam constant at each specific position on the object. The object is thus processed with high accuracy regardless of the deceleration of the movement of the beam spot.

The optical system may change the diameter of the beam spot formed on the object based on the laser beam. The energy at the beam spot is adjusted by changing the diameter of the beam spot.

The processing apparatus may further comprise: a controller circuit controlling adjustment of the energy of the laser beam at the beam spot based on the distance between the object and the output end. When the laser beam is condensed on a collective lens for processing the object, for example, the diameter of the beam spot changes depending on the distance between the object and the output end. The beam spot becomes larger or smaller. The change of the diameter of the beam spot induces a change in the energy density of the laser beam. The change of the energy density can be utilized to adjust the energy of the laser beam irradiated onto a unit area for a unit time. The optical system serves to keep the energy of the laser beam constant at each specific position on the object. The object is processed with high accuracy regardless of the acceleration of the movement of the beam spot.

The optical system may include a collective lens moving toward and away from the object. The collective lens is designed to form the beam spot having the minimum diameter at a specific focal distance. The movement of the collective lens toward and away from the object causes a change in the diameter of the beam spot. The energy of the laser beam at the beam spot is adjusted by changing the diameter of the beam spot. Likewise, the optical system may include an optical filter having various degrees of the optical density. The energy of the laser beam at the beam spot is adjusted based on the optical density of the optical filter. Alternatively, the optical system may include a diaphragm. Otherwise, the optical system may include a beam expander. In either case, the energy of the laser beam is adjusted at the beam spot.

According to another aspect of the invention, there is provided a method of processing, comprising: emitting a laser beam to an object on a stage through an output end; and adjusting the energy of the laser beam emitted, through the output end, onto a unit area for a unit time with the assistance of an optical system placed between the output end and the object.

The method allows formation of a beam spot on the object based on the laser beam. The energy of the beam spot enables cutting or bending of the object. Moreover, the optical system serves to adjust the energy of the laser beam irradiated to the object. The energy of the laser beam instantly changes as compared with the case where the energy of the laser beam is adjusted based on a driving voltage applied to a laser oscillator, for example. The object is thus processed by using the laser beam with high accuracy.

According to still another aspect of the invention, there is provided a method of making a leaf spring, comprising: emitting a laser beam to a leaf spring on a stage through an output end so as to subject the leaf spring to a bending process; and adjusting the energy of the laser beam emitted, through the output end, onto a unit area for a unit time with the assistance of an optical system placed between the output end and the leaf spring.

The method allows formation of a beam spot of the laser beam on the surface of the leaf spring. The energy of the beam spot enables bending of the leaf spring, namely the establishment of a gorge. Moreover, the optical system serves to adjust the energy of the laser beam irradiated to the leaf spring. The energy of the laser beam instantly changes as compared with the case where the energy of the laser beam is adjusted based on a driving voltage applied to a laser oscillator, for example. The leaf spring is thus processed by using the laser beam with high accuracy.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
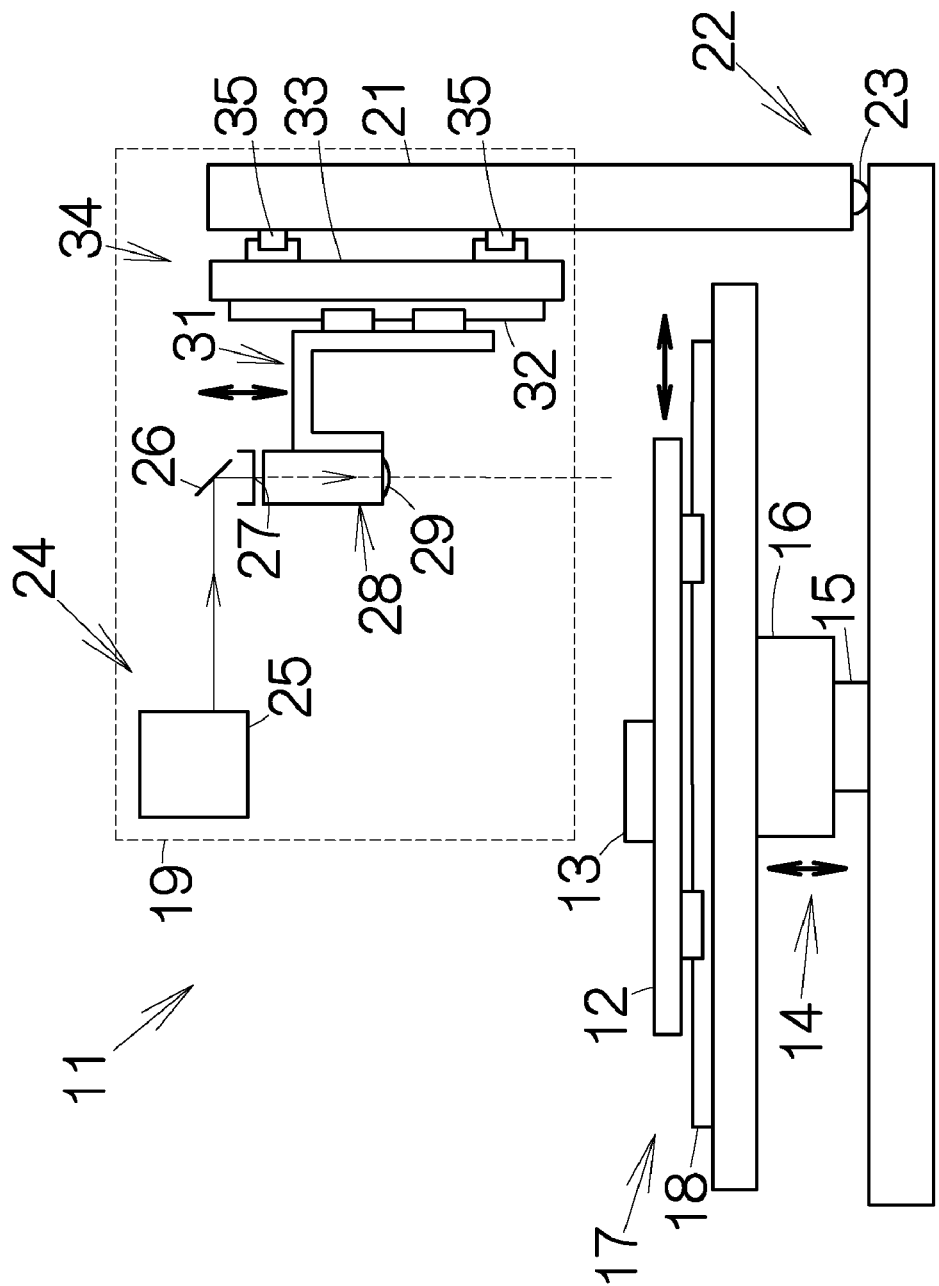
FIG. 1 is a front view schematically illustrating a laser processing apparatus according to an embodiment of the invention.

FIG. 1 illustrates a laser processing apparatus 11 according to an embodiment. As shown in FIG. 1, the laser processing apparatus 11 includes a stage 12 for positioning an object. The stage 12 defines a support surface 13 extending within a horizontal plane. The support surface 13 is allowed to move in the vertical direction or in the direction of a z-axis, namely the z-axis direction. The stage 12 is supported on a z-axis driving mechanism 14. The z-axis driving mechanism 14 drives the stage 12, namely the support surface 13, in the z-axis direction. The z-axis driving mechanism 14 includes a pedestal 15 and a z-axis movable body 16, for example. The pedestal 15 stands upright in the z-axis direction. The pedestal 15 is designed to guide the movement of the z-axis movable body 16 in the z-axis direction. The stage 12 is mounted on the z-axis movable body 16. A ball screw mechanism or a linear motor mechanism is employed to realize the movement of the z-axis movable body 16 in the z-axis direction, for example. The support surface 13 is also allowed to move in the direction of an x-axis, namely the x-axis direction, set parallel to a horizontal plane. The stage 12 is supported on an x-axis driving mechanism 17. The x-axis driving mechanism 17 drives the stage 12, namely the support surface 13, in the x-axis direction. The x-axis driving mechanism 17 includes a guide rail 18, for example. The guide rail 18 extends on the z-axis movable body 16 in the x-axis direction. The guide rail 18 serves to guide the movement of the stage 12 in the x-axis direction. A ball screw mechanism or a linear motor mechanism is employed to realize the x-axis movement of the stage 12, for example.

A processing head unit 19 is related to the stage 12. The processing head unit 19 is supported on a support column 21. The support column 21 is allowed to move in the direction of a y-axis, namely the y-axis direction, within a horizontal plane. The y-axis is set perpendicular to the aforementioned x-axis within the horizontal plane. The support column 21 is supported on a y-axis driving mechanism 22. The y-axis driving mechanism 22 drives the support column 21 in the y-axis direction. The y-axis driving mechanism 22 includes a guide rail 23 designed to guide the movement of the support column 21 in the y-axis direction, for example.

A laser source 24 is incorporated in the processing head unit 19. The laser source 24 includes a laser oscillator 25. The laser oscillator 25 is capable of emitting a laser beam of a predetermined intensity in response to an applied voltage. A mirror 26 and other optical components, for example, are optically coupled to the laser oscillator 25. The laser beam emitted from the laser oscillator 25 is led to an output end 27, facing downward, through the mirror 26. A parallel beam of the laser beam is emitted in the z-axis direction or in the direction of gravity. The laser oscillator 25 may be a solid-state laser oscillator such as YAG (yttrium aluminum garnet) laser oscillator, or a gas laser oscillator such as a CO2 (carbon dioxide) oscillator, an Ar (argon) oscillator or an excimer laser oscillator, for example. Alternatively, an optical fiber may be employed to supply the laser beam from the laser oscillator 25 to the output end 27. The laser source 24 is set stationary to the support column 21, for example.

An optical system 28 according to a first embodiment is connected to the output end 27 of the laser source 24. The optical system 28 includes a collective lens 29. The optical axis of the collective lens 29 is aligned with the optical axis of the aforementioned output end 27. The collective lens 29 is designed to focus the laser beam. The laser beam is emitted in the direction of gravity through the collective lens 29. The position of the collective lens 29 can be changed in the z-axis direction. The collective lens 29 is attached to a z-axis positioning mechanism 31. The z-axis positioning mechanism 31 drives the collective lens 29 in the z-axis direction. The z-axis positioning mechanism 31 includes a guide rail 32. The collective lens 29 is mounted on the guide rail 32. The guide rail 32 extends on a support member 33 in the vertical direction or in the z-axis direction. The guide rail 32 is designed to guide the movement of the collective lens 29 in the z-axis direction.

A ball screw mechanism or a linear motor mechanism may be employed to realize the displacement of the collective lens 29 in the z-axis direction, for example. According to the present embodiment, since a parallel beam is led into the collective lens 29, the displacement of the collective lens 29 in the z-axis direction causes the focal point of the emitted laser beam to move in the vertical direction or in the z-axis direction. The position of the collective lens 29 can also be changed in the y-axis direction. The support member 33 is attached to a y-axis positioning mechanism 34 for the realization of such a displacement of the collective lens 29 in the y-axis direction. The y-axis positioning mechanism 34 includes guide rails 35. The support member 33 is mounted on the guide rails 35. The guide rails 35 extend on the support column 21 in the horizontal direction or in the y-axis direction. The guide rails 35 serve to guide the displacement of the support member 33 in the y-axis direction. A ball screw mechanism or a linear motor mechanism is employed to realize the y-axis positioning of the support member 33, for example.

Figure 2:
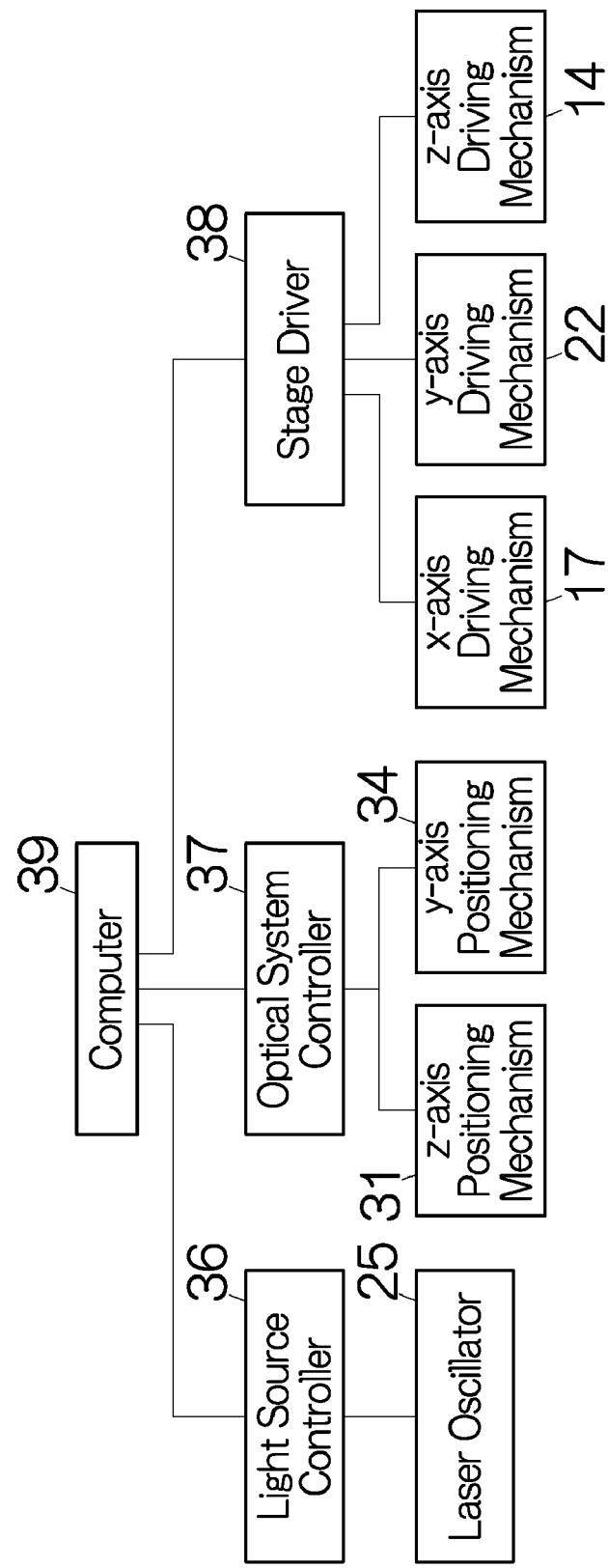
FIG. 2 is a block diagram schematically illustrating a control system of the laser processing apparatus.

As shown in FIG. 2, a light source controller 36 is connected to the laser oscillator 25. The light source controller 36 is designed to control the operation of the laser oscillator 25. The light source controller 36 is designed to apply a driving voltage to the laser oscillator 25 in accordance with conditions of oscillation of the laser beam, such as the laser power, the laser pulse width, the pulse duty and the pulse frequency. Adjustment of the pulse duty or the pulse frequency causes a change in the peak energy of the laser beam emitted from the laser oscillator 25. Adjustment of the laser power or the pulse width causes a change in the average energy of the laser beam emitted from the laser oscillator 25.

An optical system controller 37 is connected to the z-axis positioning mechanism 31 and the y-axis positioning mechanism 34. The optical system controller 37 is designed to control the action of the z-axis driving mechanism 37 and the y-axis positioning mechanism 34. Such control realizes the displacement of the optical system 28 in the z-axis direction and the y-axis direction. The optical system controller 37 is designed to supply a control signal to the z-axis positioning mechanism 31 in accordance with the position of the focal point of the laser beam in the z-axis direction. The z-axis positioning mechanism 31 drives the optical system 28, namely the collective lens 29, for the upward and downward movements in the z-axis direction in response to the reception of the control signal. The optical system controller 37 is also designed to supply a control signal to the y-axis positioning mechanism 34 in accordance with the position of the focal point of the laser beam in the y-axis direction. The y-axis positioning mechanism 34 drives the optical system 28, namely the collective lens 29, for the horizontal movement in the y-axis direction in response to the reception of the control signal.

A stage driver 38 is connected to the z-axis driving mechanism 14, the x-axis driving mechanism 17 and the y-axis driving mechanism 22. The stage driver 38 is designed to control the action of the z-axis driving mechanism 14, the x-axis driving mechanism 17 and the y-axis driving mechanism 22. The stage driver 38 obtains predetermined position information for controlling the operation of these driving mechanisms 14, 17, 22. A relative position is specified between the optical system 28 and the support surface 13 on the stage 12 based on the obtained position information. The stage driver 38 supplies control signals to the z-axis driving mechanism 14, the x-axis driving mechanism 17 and the y-axis driving mechanism 22, respectively, in accordance with the specified relative position. The z-axis driving mechanism 14 drives the stage 12 for movement of the stage 12 in the z-axis direction in response to the reception of the control signal. The x-axis driving mechanism 17 likewise drives the stage 12 for movement in the x-axis direction in response to the reception of the control signal. The y-axis driving mechanism 22 likewise drives the processing head unit 19 for movement in the y-axis direction in response to the reception of the control signal.

A computer 39 is connected to the light source controller 36, the optical system controller 37 and the stage driver 38. The computer 39 is designed to comprehensively manage the operation of the light source controller 36, the optical system controller 37 and the stage driver 38 in accordance with a predetermined program. The computer 39 specifies not only a target relative velocity between the laser beam and the stage, namely between the collective lens 29 and the stage 12, but also the energy density of the laser beam per unit time, for management of the operation. The relative velocity between the laser beam and the stage 12 is maintained at a target relative velocity, namely the maximum relative velocity. Specifically, the laser beam moves in the horizontal direction at a uniform velocity equal to the target relative velocity. The optical system controller 37 generates a control signal for the y-axis positioning mechanism 34 in accordance with the target relative velocity. When the computer 39 specifies the energy density per unit time for the relative velocity, the computer 39 calculates the conditions of the laser beam, such as the laser power, the laser pulse width, the pulse duty and the pulse frequency. The calculated conditions of oscillation are notified to the light source controller 36. The light source controller 36 generates a driving voltage in accordance with the calculated conditions of oscillation. In this embodiment, once the conditions of oscillation are set, the conditions of the laser oscillator 25 are maintained at the calculated conditions throughout the processing of an object.

Figure 3:
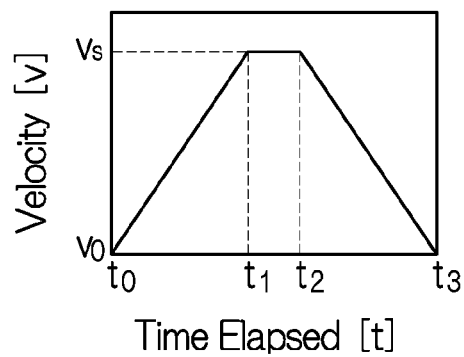
FIG. 3 is a graph schematically showing the velocity of movement of a laser beam.

The computer 39 likewise specifies a relative velocity during acceleration and a relative velocity during deceleration based on the specified target relative velocity. As shown in FIG. 3, the relative velocity between the laser beam and the stage 12 changes from a rest state $V_0$ to a target relative velocity $V_S$ at a predetermined acceleration, in this case, at a uniform acceleration, for example. Likewise, the relative velocity between the laser beam and the stage 12 changes from the target velocity $V_S$ to the rest state $V_0$ at a predetermined deceleration, in this case, at a uniform deceleration, for example. The computer 39 specifies the velocity of the collective lens 29 in the y-axis direction based on such acceleration and deceleration. The specified velocity of the collective lens 29 in the y-axis direction is notified to the optical system controller 37. The optical system controller 37 generates a control signal in accordance with the specified velocity of the collective lens 29 in the z-axis direction. In this embodiment, a lookup or reference table is utilized to specify the relationship between the acceleration and the velocity of the collective lens 29 as well as between the deceleration and the velocity of the collective lens 29. The lookup table may be stored in a storage device incorporated in the computer 39, for example. Experimental measurement may be effected to specify the relationship between the acceleration and the velocity of the collective lens 29 as well as between the deceleration and the velocity of the collective lend 29. A real-time operating system (OS) may be employed to realize the operation of the program in the computer 39 for such control.

Figure 4:
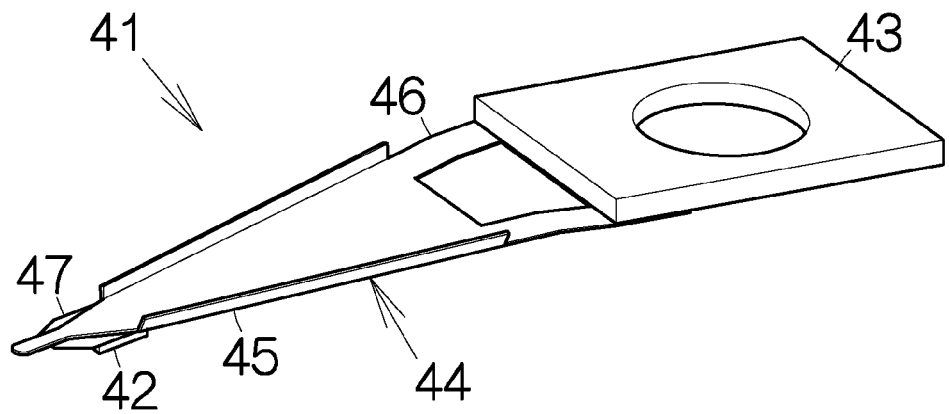
FIG. 4 is an enlarged perspective view schematically illustrating the structure of a head suspension assembly.

Now, assume that a bending process is applied to a so-called head suspension assembly in the laser processing apparatus 11. The head suspension assembly is used in a hard disk drive. The head suspension assembly is enclosed in the enclosure of the hard disk drive. As shown in FIG. 4, for example, a head suspension assembly 41 is designed to support a flying head slider 42 at the tip end of the head suspension assembly 41. An electromagnetic transducer is mounted on the flying head slider 42. The flying head slider 42 is opposed to a rotating magnetic recording disk during the operation of the hard disk drive.

The head suspension assembly 41 includes a base plate 43 coupled to a carriage, not shown. The carriage is supported on a vertical support shaft for relative rotation. The base plate 43 is superposed on the tip end of a carriage arm. The carriage arm extends from the vertical support shaft in the horizontal direction. When the carriage swings around the vertical support shaft, the flying head slider 42 is allowed to move along the radial direction of the magnetic recording disk. The electromagnetic transducer on the flying head slider 42 is in this manner positioned right above a target recording track on the magnetic recording disk.

A head suspension 44 is attached to the base plate 43. The head suspension 44 includes a load beam 45 spaced forward from the base plate 43 at a predetermined interval. A hinge 46 is defined in the head suspension 44 at a position between the base plate 43 and the load beam 45. The hinge 46 exhibits a predetermined elasticity. The head suspension 44 is made out of a plate material made of a metallic material such as aluminum, magnesium, or stainless steel for establishment of the elasticity in the hinge 46, for example.

Figure 5:
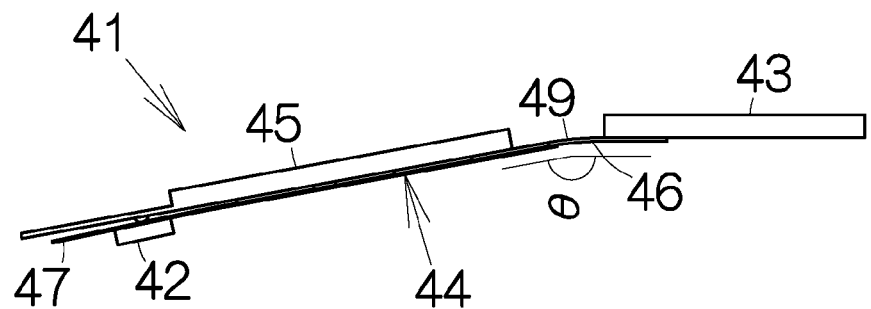
FIG. 5 is a side view of the head suspension assembly.

A flexure 47 is fixed on the surface of the head suspension 44. The flexure 47 defines a so-called gimbal at the tip end of the head suspension 44. The flying head slider 42 is fixed to the gimbal. The gimbal enables a change of the attitude of the flying head slider 42 relative to the head suspension 44. As shown in FIG. 5, the hinge 46 is bent at a processing line 49. The processing line 49 is a straight line. A predetermined bending angle θ is established between the base plate 43 and the load beam 45 around the processing line 49. A predetermined urging force is established in the load beam 45 based on the bending angle θ.

When the flying head slider 42 is opposed to the rotating magnetic recording disk, the flying head slider 42 is allowed to receive a lift resulting from airflow generated along the rotating magnetic recording disk. The characteristic of such a lift depends on the shape of the surface of the flying head slider 42. The hinge 46 serves to apply the urging force to the flying head slider 42 toward the magnetic recording disk. The flying height of the flying head slider 42 is determined based on the balance between the urging force and the lift. The urging force is determined based on the bending angle θ. The intensity of the urging force depends on the bending angle θ. Accordingly, a change in the bending angle θ results in a change in the flying height of the flying head slider 42. The urging force is adjusted by 0.01 [g].

The flying height of the flying head slider 42 depends on the elasticity or spring pressure of the hinge 46. The spring pressure is determined in accordance with a desired flying height. However, it is impossible to always establish a desired spring pressure in the hinge 46 due to the processing accuracy of the head suspension 44, for example. A laser beam is irradiated to the head suspension 44 for adjusting the spring pressure. Irradiation of the laser beam allows correction of the bending manner of the head suspension 44. The spring pressure of the hinge 46 is thus adjusted.

A method of adjusting the spring pressure of the hinge 46 includes measuring the spring pressure of the hinge 46. A difference is calculated between the measured spring pressure and a designed value of the spring pressure. The direction of adjustment and an adjustment quantity (a bending angle α) are calculated based on the calculated difference. The conditions of the laser beam are determined based on the calculated bending angle α of the hinge 46. The conditions of the laser beam corresponds to a combination of the conditions of the oscillation of the laser beam, such as the laser power, the laser pulse width, the pulse duty and the pulse frequency, the position of the irradiation of the laser beam, the number of times of the irradiation, a scanning speed of the laser beam on the hinge 46, a focal distance of the laser beam, and other conditions. Such conditions of the laser beam may be prepared beforehand in accordance with an assumed adjusting bending angle α of the hinge 46. Appropriate conditions are selected from the prepared conditions of the laser beam for the actual processing.

Figure 6:
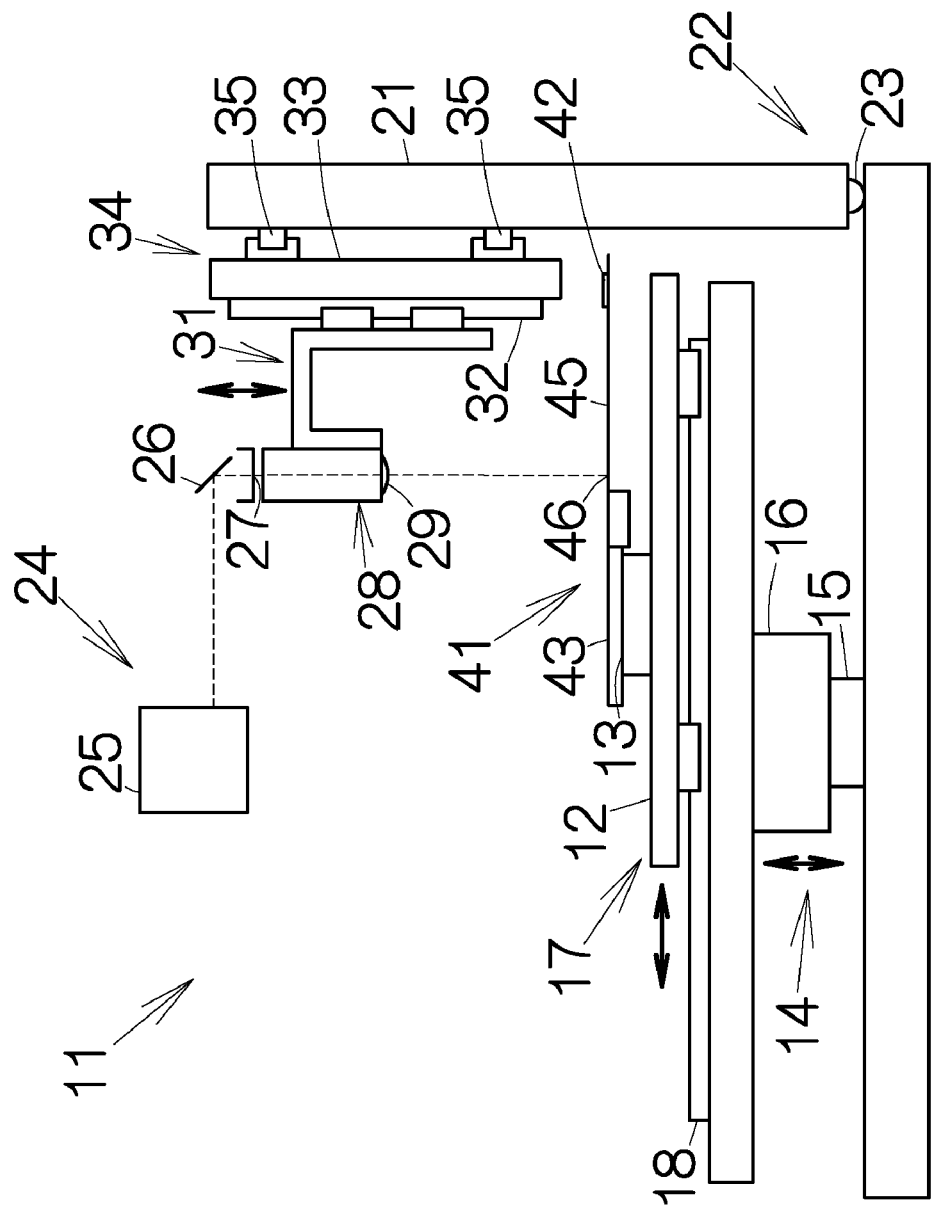
FIG. 6 is a front view schematically illustrating the laser processing apparatus during application of bending process to the head suspension assembly.
Figure 7:
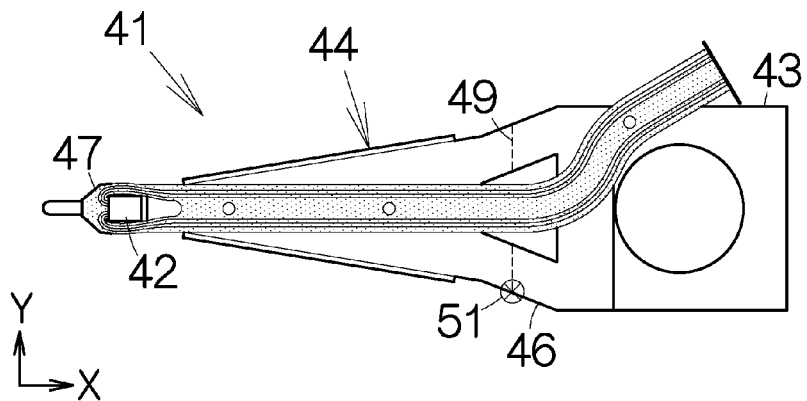
FIG. 7 is a plan view schematically illustrating the head suspension assembly set on the laser processing apparatus.

As shown in FIG. 6, for example, the head suspension assembly 41 is set on the stage 12 of the laser processing apparatus 11 for the bending process. The base plate 43 of the head suspension assembly 41 is fixed to the support surface 13. As is apparent from FIG. 7, the processing line 49 is defined on the hinge 46 of the head suspension 44, namely a leaf spring. The processing line 49 is a straight line. The processing line 49 is set in parallel with the y-axis. The head suspension 44, namely the hinge 46 extends within a horizontal plane on the stage 12. The processing line 49 corresponds to the movement path of the beam spot of the laser beam.

The computer 39 operates to determine a target relative velocity between the laser beam and the stage 12 and the energy density at the beam spot per unit time in accordance with the bending angle α. The energy density per unit time is specified based on the beam spot of the laser beam formed on the focal point of the collective lens 29. When the target relative velocity and the energy density per unit time have been set, the energy per minute unit area is specified at each specific position on the hinge 46. This energy per minute unit area results in the bending angle α or adjustment quantity. The computer 39 determines a control quantity for the y-axis positioning mechanism 34 in accordance with the target relative velocity. The computer 39 also determines the laser power, the laser pulse width, the pulse duty and the pulse frequency in accordance with the energy density per unit time. The conditions of oscillation are maintained as determined.

When the head suspension assembly 41 is fixed on the support surface 13, the computer 39 operates to position the processing line 49 at an optical axis 51 of the collective lens 29. The optical axis 51 of the collective lens 29 intersects in the vertical direction with the processing line 49 at a certain position. Simultaneously, the distance between the collective lens 29 and the surface of the hinge 46 is set equal to the focal distance of the collective lens 29. The computer 39 obtains the position information of the optical system 28 and the stage 12. Control quantities are determined for the z-axis driving mechanism 14, the x-axis driving mechanism 17, the y-axis driving mechanism 22, the z-axis positioning mechanism 31 and the y-axis positioning mechanism 34, respectively, based on the position information. The stage driver 38 correspondingly generates control signals in accordance with the determined control quantities. The generated control signals are supplied to the z-axis driving mechanism 14, the x-axis driving mechanisms 17 and the y-axis driving mechanism 22, respectively. Likewise, the optical system controller 37 correspondingly generates control signals in accordance with the determined control quantities, respectively. The generated control signals are supplied to the z-axis positioning mechanism 31 and the y-axis positioning mechanism 34, respectively.

Figure 8:
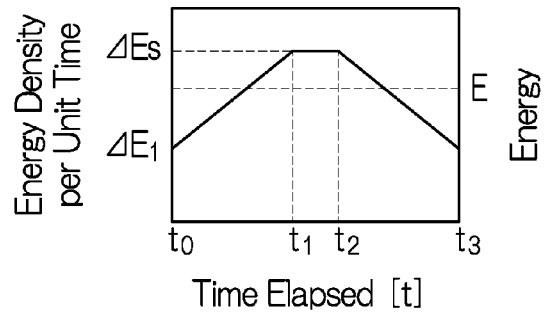
FIG. 8 is a graph showing a change in the energy density per unit time and the energy per minute unit area during movement of a laser beam.

The computer 39 specifies a change in the relative velocity between the collective lens 29 and the head suspension assembly 41 based on the target relative velocity and the distance of the movement of the beam spot. Specifically, a change of the velocity is specified in the relative velocity. The computer 39 specifies the velocity of the collective lens 29 in the z-axis direction based on the specified change in the velocity. The control quantity is thus specified for the z-axis positioning mechanism 31. In this embodiment, the acceleration of the z-axis positioning mechanism 31 is utilized to determine the velocity of the collective lens 29 in the z-axis direction. Here, the acceleration includes a negative acceleration, namely the deceleration. In addition, in this embodiment, the optical system 28 serves to maintain the energy per minute unit area of the laser beam, irradiated to the head suspension assembly 41, constant regardless of a change in the relative velocity between the collective lens 29 and the head suspension assembly 41. As shown in FIG. 8, when the energy per minute unit area of the laser beam is to be kept constant, the energy density per unit time increases in response to the acceleration of the relative movement from the rest state $V_0$ to the target velocity $V_s$. On the contrary, the energy density per unit time decreases in response to the deceleration of the relative movement from the target velocity $V_s$ to the rest state $V_0$. Here, the energy density of the beam spot depends on the position of the focal point of the collective lens 29. When the beam spot of the laser beam expands based on the movement of the focal point, the energy density of the laser beam per unit time is reduced. The movement of the optical system 28 in the z-axis direction realizes the movement of the focal point.

The computer 39 generates a notification signal specifying the conditions of the laser beam. The notification signal is supplied to the light source controller 36. The light source controller 36 applies a driving voltage to the laser oscillator 25 in accordance with the notified conditions. The laser oscillator 25 emits a laser beam. The emitted laser beam is led to the output end 27 through the mirror 26. The laser beam is led into the optical system 28 from the output end 27. The collective lens 29 condenses the laser beam.

Figure 9:
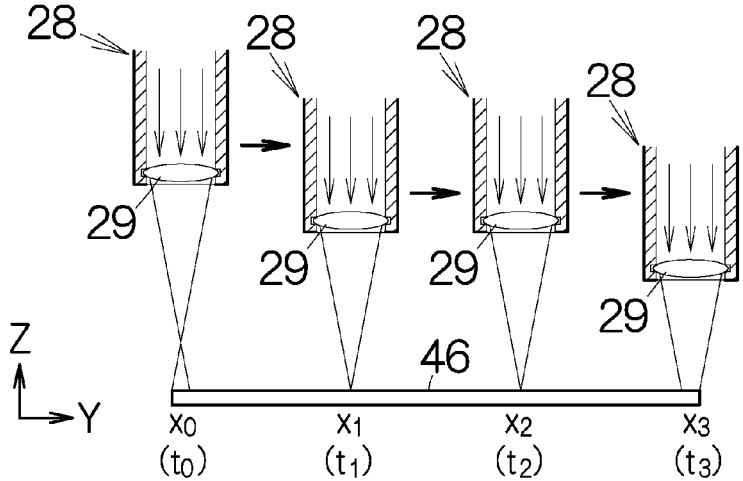
FIG. 9 is an operation diagram of the laser processing apparatus, schematically illustrating the operation of an optical system according to a first embodiment of the invention.

FIG. 9 schematically illustrates a positional relationship in the z-axis direction between the hinge 46 and the collective lens 29. The beam spot formed on the hinge 46 moves in the y-axis direction from the $x_0$ position (time $t_0$) to the $x_3$ position (time $t_3$). The movement of the collective lens 29 is accelerated on the path from the $x_0$ position (time $t_0$) to the $x_1$ position (time $t_1$). The collective lens 29 moves from the $x_1$ position (time $t_1$) to the $x_2$ position (time $t_2$) at a constant velocity. The movement of the collective lens 29 is decelerated on the path from the $x_2$ position (time $t_2$) to the $x_3$ position (time $t_3$). In this embodiment, the movement of the collective lens 29 in the y-axis direction is utilized to realize the movement of the beam spot. The collective lens 29 preferably has a diameter remarkably larger than the movement distance of the beam spot. The collective lens 29 preferably has a diameter remarkably larger than the diameter of the cross section of a parallel beam of the laser beam.

As shown in FIG. 9, the relative velocity is low between the collective lens 29 and the hinge 46 at the $x_0$ position (time $t_0$). The focal point of the laser beam is set at a position spaced from the surface of the hinge 46 through the movement of the collective lens 29 in the z-axis direction. The collective lens 29 at this position is spaced from the surface of the hinge 46 at a distance larger than the focal distance. The beam spot is allowed to have the maximum diameter on the surface of the hinge 46 at $x_0$ position (time $t_0$).

The computer 39 specifies a control quantity for the y-axis positioning mechanism 34 based on the aforementioned target relative velocity upon the emission of the laser beam. The optical system controller 37 generates a control signal in accordance with the specified control quantity. The generated control signal is supplied to the y-axis positioning mechanism 34. The collective lens 29 starts moving in the y-axis direction. The beam spot of the laser beam follows the processing line 49.

The collective lens 29 accelerates at a predetermined acceleration from the rest state to the target relative velocity. The optical system controller 37 generates a control signal in accordance with a control quantity specified based on the acceleration of the collective lens 29. The generated control signal is supplied to the z-axis positioning mechanism 31. The collective lens 29 gets closer to the hinge 46 in the z-axis direction as the collective lens 29 accelerates. The focal point of the collective lens 29 thus gets closer to the surface of the hinge 46. The beam spot deflates on the surface of the hinge 46. The energy density per unit time of the laser beam is increased as compared with the energy density at $x_0$ position. The energy per minute unit area is in this manner kept constant on the surface of the hinge 46 irrespective of the acceleration of the relative movement. The hinge 46 thus bends to form a ridgeline of a uniform angle at the processing line 49 over a range between the rest position (the $x_0$ position) and an acceleration terminal position (the $x_1$ position).

The movement of the collective lens 29 in the y-axis direction reaches the target relative velocity at the $x_1$ position. The collective lens 29 is then refrained from the movement in the z-axis direction. A control signal is supplied from the optical system controller 37 to the z-axis positioning mechanism 31 for terminating the movement of the collective lens 29 in the z-axis direction. The focal point of the collective lens 29 is positioned on the surface of the hinge 46. Specifically, the distance between the collective lens 29 and the surface of the hinge 46 corresponds to the focal distance of the collective lens 29. Such a state is maintained during the movement of the collective lens 29 to the $x_2$ position at a constant velocity. The beam spot is allowed to have the minimum diameter on the surface of the hinge 46. The beam spot thus realizes the maximum energy density per unit time. The energy per minute unit area is in this manner kept constant at each position of the beam spot. The hinge 46 thus bends to form a ridgeline of a uniform angle along the processing line 49 over a range between the acceleration terminal position (the $x_1$ position) and a target relative velocity terminal position (the $x_2$ position).

When the collective lens 29 has reached the $x_2$ position, the collective lens 29 starts decelerating at a predetermined deceleration prior to termination of the movement in the y-axis direction. The optical system controller 37 generates a control signal for the z-axis positioning mechanism 31 in accordance with a control quantity specified based on the deceleration. The generated control signal is supplied to the z-axis positioning mechanism 31. The collective lens 29 gets closer to the hinge 46 in the z-axis direction as the collective lens 29 decelerates. The focal point of the collective lens 29 thus gets farther from the surface of the hinge 46. The beam spot gradually expands on the surface of the hinge 46. The energy density per unit time of the laser beam is gradually decreased. The energy per minute unit area is in this manner kept constant on the surface of the hinge 46 regardless of the deceleration of the relative movement. The hinge 46 thus bends to from a ridgeline of a uniform angle at the processing line 49 over a range between the target velocity terminal position (the $x_2$ position) and a stoppage position (the $x_3$ position).

When the collective lens 29 has reached the $x_3$ position, the collective lens 29 stops moving in the y-axis direction. The light source controller 36 stops applying the driving voltage to the laser oscillator 25. The laser oscillator 25 stops emitting the laser beam. In this bending process, the beam spot may be formed on the surface of the hinge 46 at a position far from the focal point of the collective lens 29 so as to expand the beam spot. Alternatively, the beam spot may be formed on the surface of the hinge 46 at a position inside the focal point of the collective lens 29 so as to expand the beam spot.

Referring also to FIG. 8, since the beam spot on the surface of the hinge 46 is allowed to have a large diameter at time $t_0$ and time $t_3$, the energy density ($\Delta E_1$) per unit time of the laser beam is relatively low at time $t_0$ and time $t_3$. On the other hand, since the beam spot on the surface of the hinge 46 is allowed to have a small diameter at time $t_1$ and time $t_2$, the energy density ($\Delta E_2$) per unit time of the laser beam is relatively high at time $t_1$ and time $t_2$. It should be noted that since the relative velocity between the collective lens 29 and the hinge 46 changes in accordance with the elapsed time t, the energy (E) is kept constant at any specific position on the hinge 46. The energy is a function of the energy density per unit time and the relative velocity between the collective lens 29 and the hinge 46. Specifically, when the collective lens 29 relatively accelerates in the y-axis direction, the focal point of the collective lens 29 is forced to gradually get closer to the surface of an object. The energy density per unit time acts on the object in an increased manner in response to a reduced distance between the focal point and the object. On the contrary, when the collective lens 29 relatively decelerates in the y-axis direction, the focal point of the collective lens 29 is forced to gradually get farther from the surface of the object. The laser beam having a constant energy is in this manner utilized to realize the bending process of the hinge 46.

The movement of the collective lens 29 is utilized to change the distance between the collective lens 29 and an object in the aforementioned embodiment. Alternatively, the movement of the stage 12 may be utilized to change the distance between the collective lens 29 and an object. Otherwise, the movement of the collective lens 29 in combination with the movement of the stage 12 may be utilized to change the distance between the collective lens 29 and an object.

Figure 10:
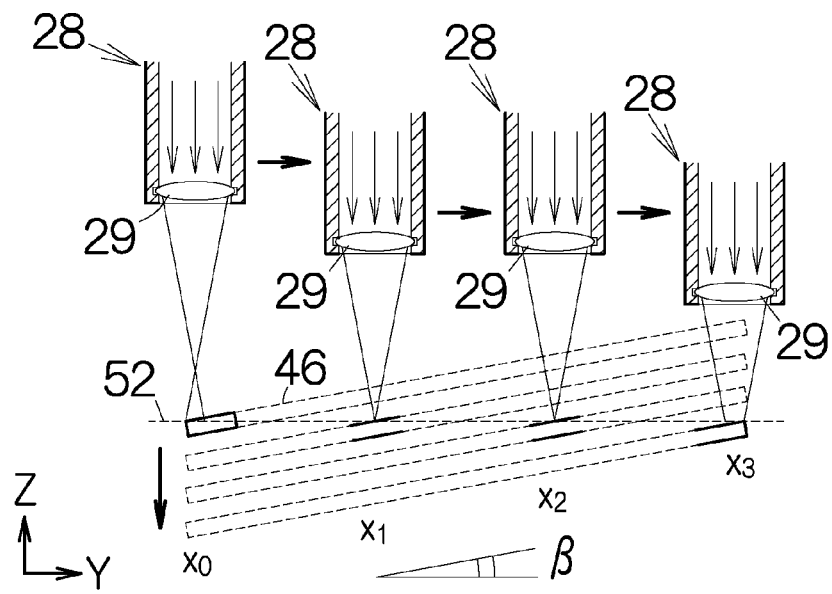
FIG. 10 is an operation diagram of the laser processing apparatus, schematically illustrating the operation of the optical system according to the first embodiment when a processing line is inclined.

Now, as shown in FIG. 10, for example, assume that the processing line 49 of the aforementioned head suspension assembly 41 is inclined from a horizontal plane at a predetermined inclination angle β. Here, the light source controller 36 controls the operation of the laser oscillation 25 in the same manner as described above. The optical system controller 37 controls the operation of the z-axis positioning mechanism 31 and the y-axis positioning mechanism 34 in the same manner as described above. The stage driver 38 controls the operation of the x-axis driving mechanism 17 and the y-axis driving mechanism 22 in the same manner as described above. The stage driver 38 controls the operation of the z-axis driving mechanism 14 in view of the inclination angle β.

The collective lens 29 accelerates at the aforementioned acceleration in the y-axis direction on the path between the rest state ($x_0$ position) and the target velocity ($x_1$ position). The stage driver 38 generates a control signal for the z-axis driving mechanism 14 in accordance with a control quantity specified based on the acceleration. The generated control signal is supplied to the z-axis driving mechanism 14. The z-axis driving mechanism 14 drives the hinge 46 for a downward movement as the collective lens 29 accelerates in the y-axis direction. The beam spot on the surface of the hinge 46 moves within an imaginary horizontal plane 52. The energy density per unit time of the laser beam increases in the same manner as described above. The energy per minute unit area is kept constant on the surface of the hinge 46 at each specific position during the acceleration of the relative movement irrespective of the inclination of the hinge 46. The hinge 46 thus bends to form a ridgeline of a uniform angle at the processing line 49 over a range between the rest position ($x_0$ position) and the acceleration terminal position ($x_1$ position).

When the movement of the collective lens 29 in the y-axis direction reaches the target relative velocity at the $x_1$ position, the stage driver 38 generates a control signal for the z-axis driving mechanism 14 in accordance with a control quantity specified based on the target relative velocity. The generated control signal is supplied to the z-axis driving mechanism 14. The z-axis driving mechanism 14 drives the hinge 46 for a downward movement during the movement of the collective lens 29 in the y-axis direction from the $x_1$ position to the $x_2$ position at a constant velocity. The beam spot on the surface of the hinge 46 moves within the imaginary horizontal plane 52. The beam spot is allowed to have the minimum diameter on the surface of the hinge 46. Since the collective lens 29 moves from the $x_1$ position to the $x_2$ position without moving in the z-axis direction, the beam spot is allowed to keep the minimum diameter. The energy density per unit time of the laser beam is thus maximized. The energy per minute unit area is in this manner kept constant on the surface of the hinge 46 at each specific position on the hinge 46 regardless of the inclination of the hinge 46. The hinge 46 thus bends to form a ridgeline of a uniform angle at the processing line 49 over a range between the acceleration terminal position ($x_1$ position) and the target velocity terminal position ($x_2$ position).

The collective lens 29 starts decelerating in the y-axis direction at the aforementioned deceleration at the $x_2$ position prior to the halt of the movement of the collective lens 29 in the y-axis direction. The stage driver 38 generates a control signal for the z-axis driving mechanism 14 in accordance with a control quantity specified based on the deceleration. The generated control signal is supplied to the z-axis driving mechanism 14. The z-axis driving mechanism 14 drives the hinge 46 for a downward movement as the collective lens 29 gets decelerated. The beam spot formed on the surface of the hinge 46 thus moves within the imaginary horizontal plane 52. Since the focal point of the collective lens 29 gets farther from the surface of the hinge 46, the energy density per unit time decreases. The energy per minute unit area is in this manner kept constant on the surface of the hinge 46 at each specific position on the hinge 46 regardless of the deceleration of the relative movement and the inclination of the hinge 46. The hinge 46 thus bends to form a ridgeline of a uniform angle at the processing line 49 over a range between the target velocity terminal position (the $x_2$ position) to the stoppage position (the $x_3$ position).

Figure 11:
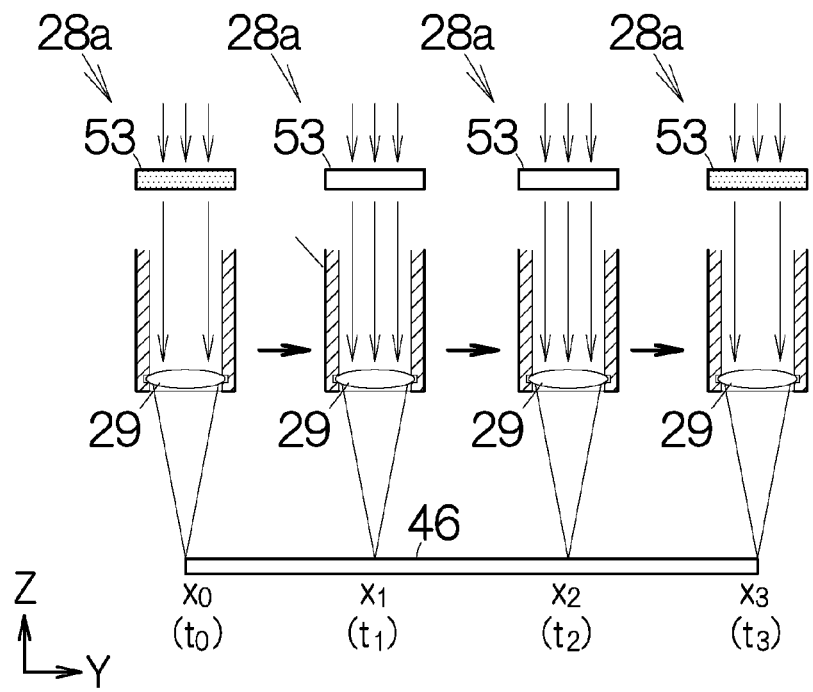
FIG. 11 is an operation diagram of the laser processing apparatus, schematically illustrating an optical system according to a second embodiment of the invention.

FIG. 11 schematically illustrates an optical system 28a according to a second embodiment. An optical filter 53 is located in a space between the output end 27 and the collective lens 29 in the optical system 28a, for example. The optical filter 53 is designed to stepwise or continuously change an optical density for a laser beam within a certain range. Specifically, the optical filter 53 serves to change the light intensity of the laser beam emitted through the collective lens 29. A change in the light intensity of the laser beam induces a change in the energy density per unit time. As a result, the energy per minute unit area is likewise kept constant irrespective of a change in the relative velocity between the collective lens 29 and the object in the same manner as described above. Specifically, the optical filter 53 serves to decrease the amount of transmission of the laser beam when the collective lens 29 accelerates relative to the object in the y-axis direction. The optical filter 53 likewise serves to decrease the amount of transmission of the laser beam when the collective lens 29 decelerates in the y-axis direction. In this embodiment, the optical filter 53 is immobilized to the support column 21 at a position on the optical axis of the output end 27. Alternatively, the optical filter 53 may move along with the collective lens 29.

Figure 12:
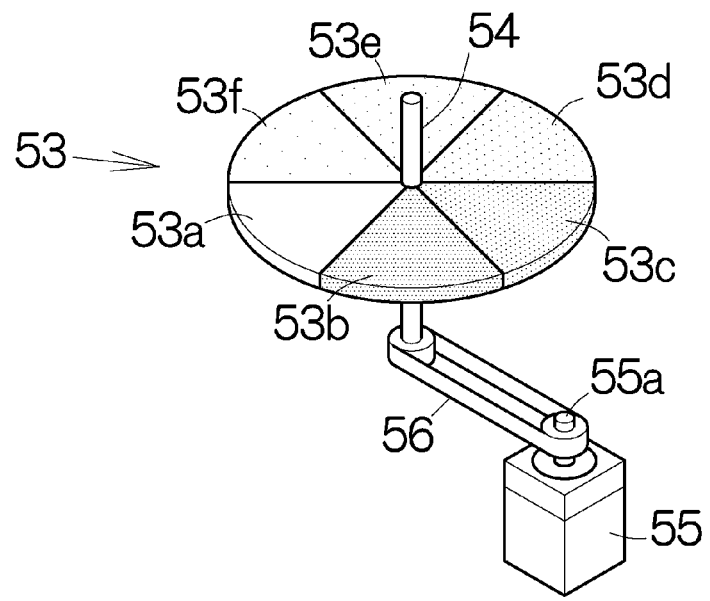
FIG. 12 is an enlarged perspective view schematically illustrating an optical filter according to a specific example.

FIG. 12 illustrates a specific example of the optical filter 53. The optical filter 53 is formed in the shape of a disk. The optical filter 53 includes filter elements 53a-53f arranged in the circumferential direction. The filter elements 53a-53f have different degrees of permeability to a laser beam. Here, optical filters are established every sixty degrees of the central angle. The optical filters comprise a filter element 53a having permeability of 100%, a filter element 53b having permeability of 90%, a filter element 53c having permeability of 80%, a filter element 53d having permeability of 70%, a filter element 53e having permeability of 60%, a filter element 53f having permeability of 50%, respectively, for example. A rotation shaft 54 is coupled to the optical filter 53. The rotation shaft 54 is set perpendicular to the optical filter 53 at the center of the optical filter 53. A stepping motor 55 is coupled to the rotation shaft 54, for example. A timing belt 56 is wound around the rotation shaft 54 and a driving shaft 55a of the stepping motor 55. The stepping motor 55 allows the optical filter 53 to rotate around the rotation shaft 54. The aforementioned optical system controller 37 may control the action of the stepping motor 55. The optical density may continuously change in the circumferential direction in a range from 100% to 50%, for example. Alternatively, the optical filter 53 may include an element capable of changing its permeability of the laser beam based on an electric control. A liquid crystal enables different degrees of permeability in a single optical filter 53. In this case, it is unnecessary to physically move the optical filter 53. Otherwise, two or more optical filters 53, 53, . . . may be incorporated in the optical system 28a. In this case, the optical filters 53, 53, . . . may have different degrees of permeability, respectively. The optical filters 53, 53, . . . may be replaced in order. The optical filters 53, 53, . . . may have the same permeability. In this case, the permeability may be adjusted by changing the number of the optical filters 53.

Figure 13:
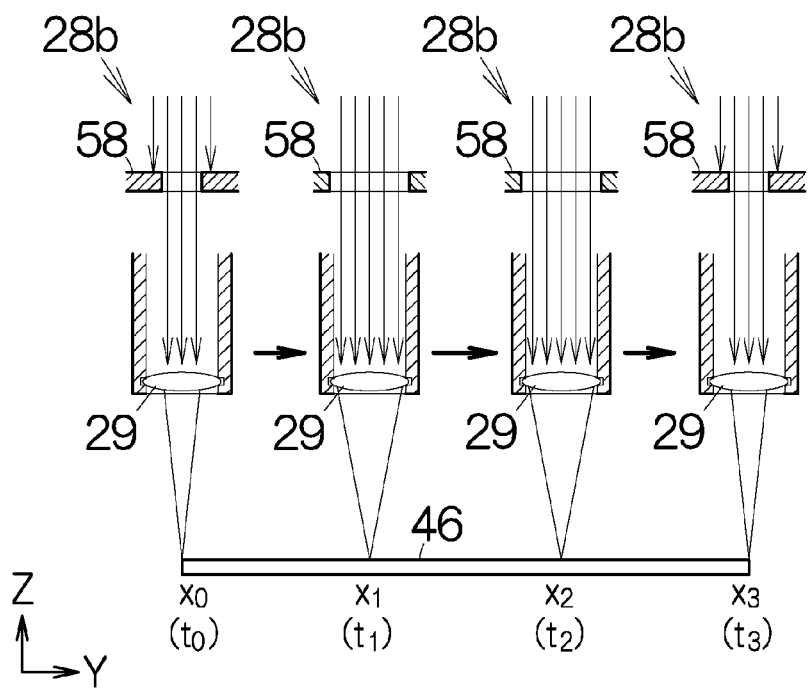
FIG. 13 is an operation diagram of the laser processing apparatus, schematically illustrating the operation of an optical system according to a third embodiment of the invention.

FIG. 13 schematically illustrates an optical system 28b according to a third embodiment. A diaphragm 58 is located in a space between the output end 27 and the collective lens 29 in the optical system 28b, for example. The diaphragm 58 is designed to stepwise or continuously change an aperture area within a certain range. Specifically, the diaphragm 58 serves to change the light intensity of the laser beam. The energy per minute unit area is likewise kept constant irrespective of a change in the relative velocity between the collective lens 29 and the object in the same manner as described above. The diaphragm 58 may utilize diaphragm blades so as to adjust the amount of transmission of the laser beam, for example. The diaphragm 58 may utilize any other structures different from the aforementioned one. In this embodiment, the diaphragm 58 is immobilized to the support column 21 at a position on the optical axis of the output end 27. Alternatively, the diaphragm 58 may move along with the collective lens 29.

Figure 14:
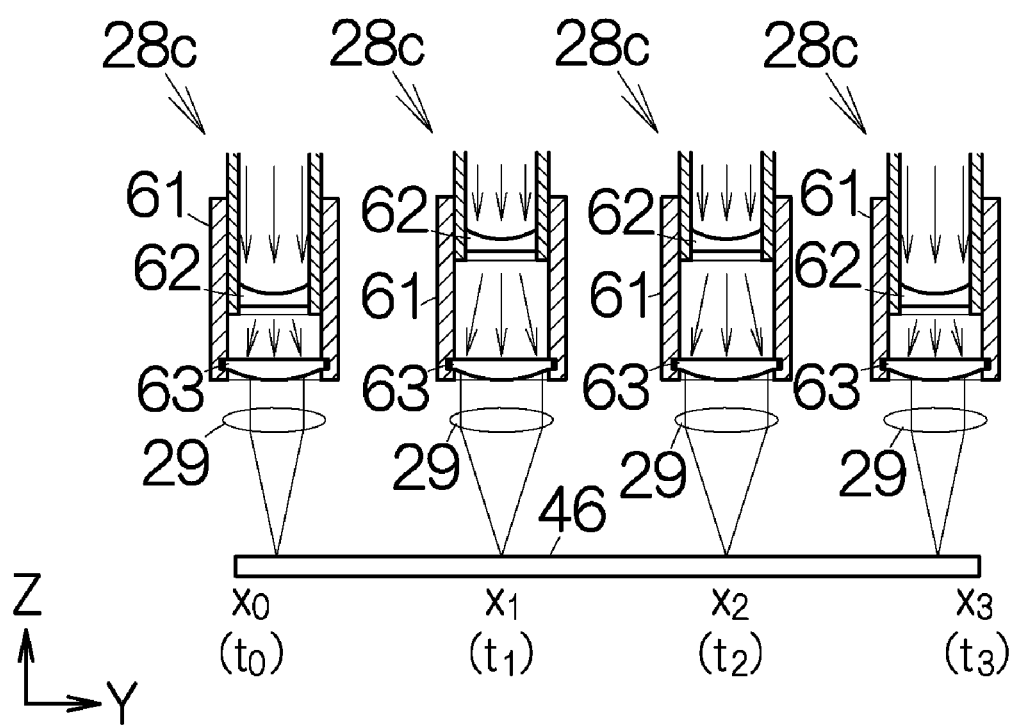
FIG. 14 is an operation diagram of the laser processing apparatus, schematically illustrating an optical system according to a fourth embodiment of the invention.

FIG. 14 schematically illustrates an optical system 28c according to a fourth embodiment. A beam expander 61 is located in a space between the output end 27 and the collective lens 29 in the optical system 28c, for example. The optical axis of the beam expander 61 is aligned with the optical axis of the collective lens 29. The beam expander 61 includes a magnifier 62 designed to expand a parallel beam of the laser beam. A lens 63 is designed to convert the laser beam emitted through the magnifier 62 into a parallel beam. The farther from the lens 63 the magnifier 62 gets, the smaller the beam spot of the laser beam emitted through the collective lens 29 becomes. The energy density per unit time thus increases. As a result, the energy per minute unit area is thus kept constant at each specific position regardless of a change in the relative velocity between the collective lens 29 and the object in the same manner as described above. An actuator may be connected to the beam expander 61, for example. The actuator enables the movement of the beam expander 62 along its optical axis.

Even when the processing line 49 is inclined from the horizontal plane at the predetermined inclination angle $\beta$ in the same manner as described above, any of the optical systems 28a, 28b, 28c can be utilized in place of the aforementioned optical system 28. In such a case, the stage driver 38 may control the action of the z-axis driving mechanism 14 based on the inclination angle $\beta$ in the same manner as described above.

What is claimed is:

1. A processing apparatus comprising:
   a stage supporting an object;
   a light source generating oscillation of a laser beam with constant conditions of the oscillation of the laser beam;
   an optical system configured to converge the laser beam to the object by using a converging section;
   a first driving mechanism causing a relative movement in a direction of the laser beam between the optical system and the stage;
   a second driving mechanism causing a relative movement in a direction perpendicular to the direction of the laser beam between the optical system and the stage; and
   a controller section configured to control the relative movement caused by the first driving mechanism in accordance with a change of velocity of the relative movement caused by the second driving mechanism.

2. A processing apparatus comprising:
   a stage supporting an object;
   a light source generating oscillation of a laser beam with constant conditions of the oscillation of the laser beam;
   an optical system configured to change amount of transmission of the laser beam irradiated to the object based on filters;
   a driving mechanism causing a relative movement in a direction perpendicular to a direction of the laser beam between the optical system and the stage; and
   a controller section configured to adjust the amount of the transmission by controlling the optical system in response to a change of velocity of the relative movement caused by the driving mechanism.

3. A processing apparatus comprising:
   a stage supporting an object;
   a light source generating oscillation of a laser beam with constant conditions of the oscillation of the laser beam;
   an optical system configured to change amount of transmission of the laser beam irradiated to the object based on a diaphragm;
   a driving mechanism causing a relative movement in a direction perpendicular to a direction of the laser beam between the optical system and the stage; and
   a controller section configured to adjust the amount of the transmission by controlling the optical system in response to a change of velocity of the relative movement caused by the driving mechanism.

* * * * *